United States Patent
Henon et al.

(10) Patent No.: US 9,358,923 B2
(45) Date of Patent: Jun. 7, 2016

(54) DASHBOARD AND METHOD FOR ASSEMBLING A DASHBOARD

(76) Inventors: Fabrice Henon, Cergy (FR); Benoit Box, L'isle Adam (FR)

( * ) Notice: Subject to any disclaimer, the term of this patent is extended or adjusted under 35 U.S.C. 154(b) by 279 days.

(21) Appl. No.: 14/002,258

(22) PCT Filed: Feb. 28, 2012

(86) PCT No.: PCT/EP2012/000861
§ 371 (c)(1),
(2), (4) Date: Dec. 4, 2013

(87) PCT Pub. No.: WO2012/116804
PCT Pub. Date: Sep. 7, 2012

(65) Prior Publication Data
US 2014/0078712 A1    Mar. 20, 2014

(30) Foreign Application Priority Data

Mar. 3, 2011 (DE) .......................... 10 2011 012 933
Jun. 7, 2011 (FR) ...................................... 11 01736

(51) Int. Cl.
*G01D 11/28*  (2006.01)
*B60Q 3/04*  (2006.01)
*B60K 37/02*  (2006.01)

(52) U.S. Cl.
CPC ................ *B60Q 3/044* (2013.01); *B60K 37/02* (2013.01); *G01D 11/28* (2013.01); *B60K 2350/203* (2013.01); *B60K 2350/2034* (2013.01); *B60K 2350/2039* (2013.01); *Y10T 29/49002* (2015.01)

(58) Field of Classification Search
CPC .......... B60Q 3/04; B60K 37/02; B60K 37/04; B60K 2350/203

USPC .............................................. 362/23.21, 489
See application file for complete search history.

(56) References Cited

U.S. PATENT DOCUMENTS 5,406,303 A * 4/1995 Salmon .................. B60K 35/00
                                                                116/DIG. 36
5,934,782 A    8/1999 Atkins et al.
(Continued)

FOREIGN PATENT DOCUMENTS

EP        1 442 919 A1    8/2004
JP        2009-210302     9/2009
(Continued)

OTHER PUBLICATIONS

Japanese Office Action issued Sep. 25, 2014 and mailed Sep. 30, 2014.
(Continued)

*Primary Examiner* — Andrew Coughlin
(74) *Attorney, Agent, or Firm* — Fletcher Yoder, P.C.

(57) ABSTRACT

A dashboard for automobiles includes at least one display area including a first portion and a second portion. The first portion is located in a first extension plane while the second portion is located in a second extension plane. The second extension plane is parallel to the first extension plane and is offset relative to the first extension plane in the direction of the user of the dashboard such that the second portion forms a diaphragm opening at least partially around the first portion, and the first portion is located in a central area of the dashboard. The dashboard includes a light source, and the display area comprises a frame member for defining the first portion, wherein the light source comprises a first portion for backlighting the first portion, as well as a second portion in which the light source extends beyond the first portion of the display area.

9 Claims, 5 Drawing Sheets

(56) References Cited

U.S. PATENT DOCUMENTS

Figure 1:
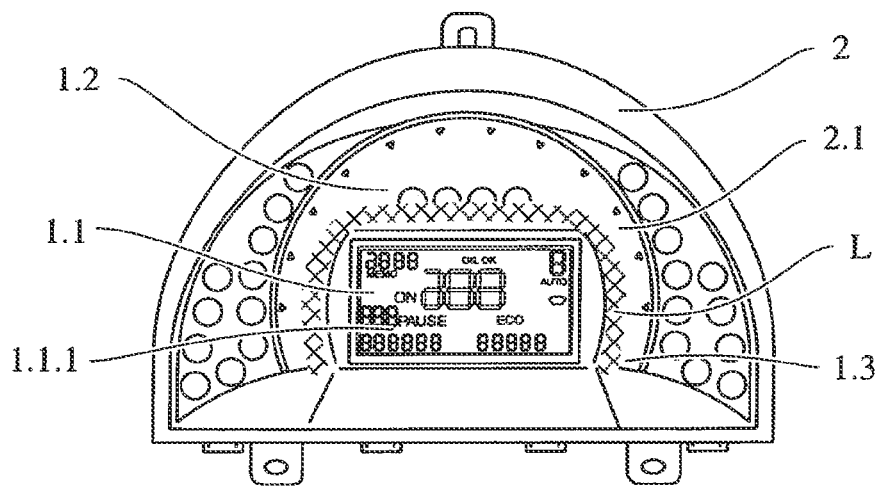

| | | |
|---|---|---|
| 7,110,064 B2 | 9/2006 | Kameda |
| 7,441,913 B2 * | 10/2008 | Bayersdorfer ...... F16H 59/0278 362/23.11 |
| 7,441,931 B2 * | 10/2008 | Bayersdorfer ......... B60K 35/00 340/815.55 |
| 7,530,702 B2 | 5/2009 | Luettgen et al. |
| 2004/0207771 A1 | 10/2004 | Kameda |
| 2006/0120062 A1 * | 6/2006 | Wu ...................... G01B 6/0046 362/23.09 |
| 2007/0263374 A1 | 11/2007 | Luettgen et al. |

FOREIGN PATENT DOCUMENTS

| | | |
|---|---|---|
| WO | 03/041982 A2 | 5/2003 |
| WO | 2008/022776 A1 | 2/2008 |

OTHER PUBLICATIONS

International Search Report for application No. PCT/EP2012/000861 mailed May 9, 2012.

Japanese Office Action issued Mar. 4, 2015 and mailed Mar. 10, 2015.

International Preliminary Report on Patentability dated Sep. 12, 2013; 7pgs.

* cited by examiner

DASHBOARD AND METHOD FOR ASSEMBLING A DASHBOARD

CROSS REFERENCE TO RELATED APPLICATIONS

This application claims priority from and the benefit of PCT Application No. PCT/EP2012/000861, filed on Feb. 28, 2012; German Patent No. DE 10 2011 012 933.2, filed on Mar. 3, 2011; and French Patent FE 11/01736, filed on Jun. 7, 2011; all entitled "Dashboard and Method for Assembling a Dashboard", which are herein incorporated by reference.

BACKGROUND

The present invention relates, on the one hand, to a dashboard, in particular for an automobile, and, on the other hand, to a method of assembly of a dashboard for an automobile.

A dashboard for an automobile producing a luminescent aureole effect (halo effect) is known in the prior art, for example from document US 2006/0120062 A1.

Such dashboards may comprise a needle such as a needle that is bent, for example, in order to display a value such as the speed or other quantities of interest to a driver of a vehicle.

In addition, dashboards are known which comprise a display area comprising a first portion and comprising a second portion, the first portion of the display area being located in a first main extension plane, the second portion of the display area being located in a second main extension plane, such that the first portion of the display area is located in a central area of the dashboard.

It is also known to provide bent needles which can be caused to rotate about an axis of rotation behind the dial of the dashboard in order to permit the dashboard to display other information at or in the vicinity of the axis of rotation of the needle.

According to the prior art, it is difficult to make a dashboard in such a way that the associated costs are minimized and yet a multitude of different functions are performed, in particular comfort functions for the user such as modes of illuminating the dashboard.

SUMMARY

The aim of the present invention is, in particular, to overcome the drawbacks of the prior art, in particular those mentioned above, a further aim being to propose a dashboard in such a way as to obtain additional illumination modes.

According to the invention, this object is achieved by a dashboard for automobiles, the dashboard comprising at least one display area, —the display area comprising a first portion, the display area comprising a second portion, the first portion of the display area being located in a first main extension plane, the second portion of the display area being located in a second main extension plane, the second main extension plane being located parallel to the first main extension plane, the second main extension plane being offset relative to the first main extension plane in the direction of a user of the dashboard in such a way that the second portion of the display area forms a diaphragm aperture at least partially around the first portion of the display area, and that the first portion of the display area is located in a central area of the dashboard, the dashboard comprising a source of light, and the display area comprising a frame member for defining the first portion of the display area, the source of light comprising a first portion for backlighting the first portion of the display area, and the source of light comprising a second portion in which the source of light extends beyond the first portion of the display area.

In such an execution of the dashboard, it is advantageously possible to provide illumination in the form of a halo between the first portion of the display area and the second portion of the display area.

According to the present invention, the second portion of the display area comprises another source of light. It is possible to backlight the first portion of the display area and the second portion of the display area with the one source of light and the other source of light. The dashboard comprises a securing member associated with the first portion of the display area. In addition, the dashboard comprises the source of light and a display device, the source of light and the display device also being associated with the first portion of the display area. It is preferred according to the present invention that the display device associated with the first portion of the display area corresponds approximately, in terms of its dimensions, to the frame member in order to define the first portion of the display area. Provision is made according to the present invention for the source of light to extend beyond (in its second portion) the first portion of the display area, that is to say the source of light extends beyond (in its second portion) the frame member in order to define the first portion of the display area.

Thus, it is advantageously possible according to the present invention for even or regular illumination to be provided at the location of the jump between the first main extension plane and the second main extension plane (that is to say at the point between the first portion of the display area and the second portion of the display area).

A preferred embodiment of the invention lies in the fact that the light from the second portion of the source of light illuminates the region of the frame member in order to define the first portion of the display area.

In such an execution of the dashboard according to the present invention, it is advantageously possible to adapt the (first portion of the) source of light for the illumination of the first portion of the display area.

According to another preferred embodiment of the dashboard according to the present invention, provision is made for the illumination of the second portion of the source of light to be visible by a user of the dashboard.

According to yet another preferred embodiment of the dashboard according to the present invention, provision is made for the light from the second portion of the source of light to be visible by a user of the dashboard in the external portion of the frame member in order to define the first portion of the display area.

In such an execution of the dashboard according to the present invention, it is advantageously possible to produce a halo effect around the first portion of the display area.

According to still a further preferred embodiment of the dashboard according to the present invention, provision is made for the dashboard to comprise a needle that is caused to rotate about an axis of rotation, the axis of rotation being intended to be positioned in the first portion of the display area, the needle being visible by a user only in the second portion of the display area.

In such an execution of the dashboard, it is advantageously possible to use the central portion of the dashboard for displaying information other than the information indicated by the needle.

Another preferred embodiment of the invention lies in the fact that the first portion of the display area comprises a display device, in particular a liquid crystal display (LCD).

Yet another preferred embodiment of the invention lies in the fact that the display device is a display device of the matrix type.

Another preferred embodiment of the invention lies in the fact that the dashboard comprises a needle that is caused to rotate about an axis of rotation, the axis of rotation being intended to be positioned in the first portion of the display area, the needle being visible by a user in the first portion of the display area.

Another object of the present invention relates to a method of assembly of a dashboard for automobiles, the dashboard comprising at least one display area, the display area comprising a first portion,
the display area comprising a second portion, the first portion of the display area being located in a first main extension plane, the second portion of the display area being located in a second main extension plane, the second main extension plane being located parallel to the first main extension plane, the second main extension plane being offset relative to the first main extension plane in the direction of a user of the dashboard in such a way that the second portion of the display area forms a diaphragm aperture at least partially around the first portion of the display area, and that the first portion of the display area is located in a central area of the dashboard, characterized in that the dashboard comprises a source of light, the display area comprising a frame member for defining the first portion of the display area, the source of light comprising a first portion for backlighting the first portion of the display area, the method of assembly comprising a stage during which the frame member is positioned in such a way that the second portion of the source of light extends beyond the first portion of the display area.

Other features and advantages of the invention will become apparent upon reading the following description of a particular non-limiting embodiment of the invention.

DRAWINGS

Figure 2:
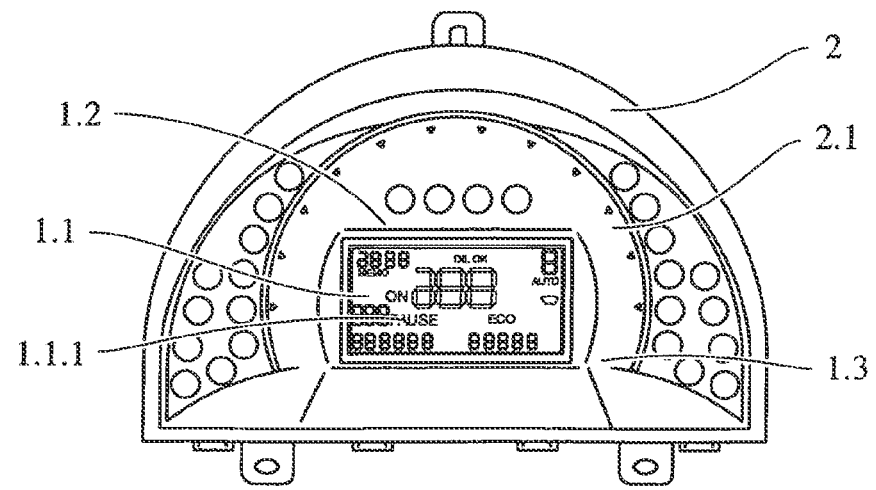
Figure 3A:
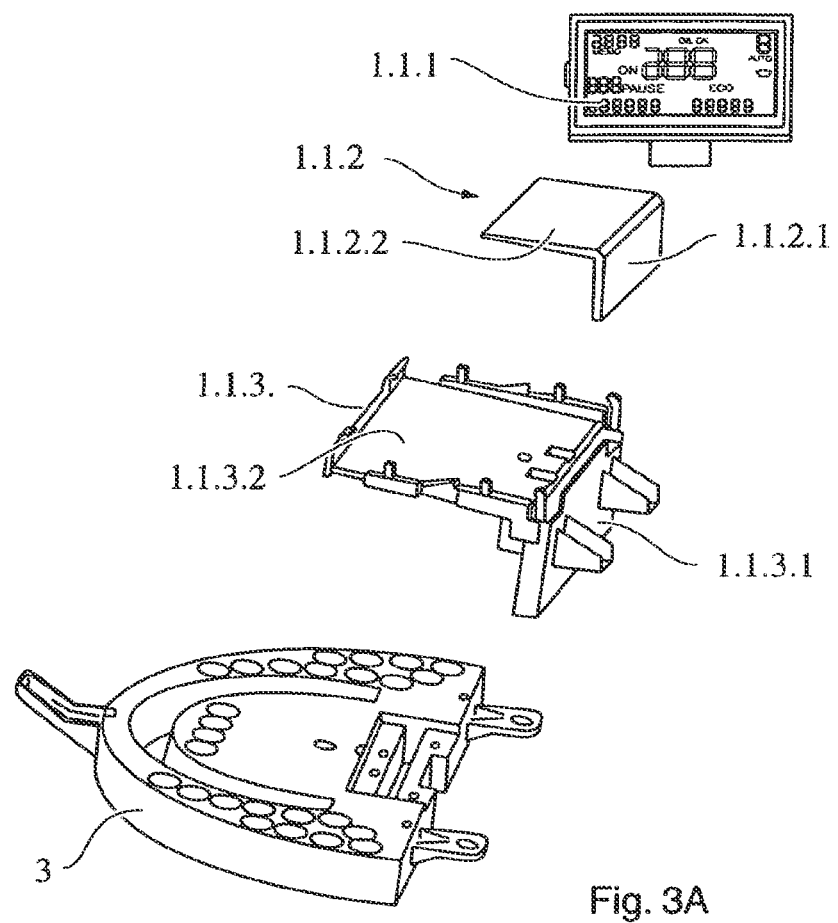
Figure 3B:
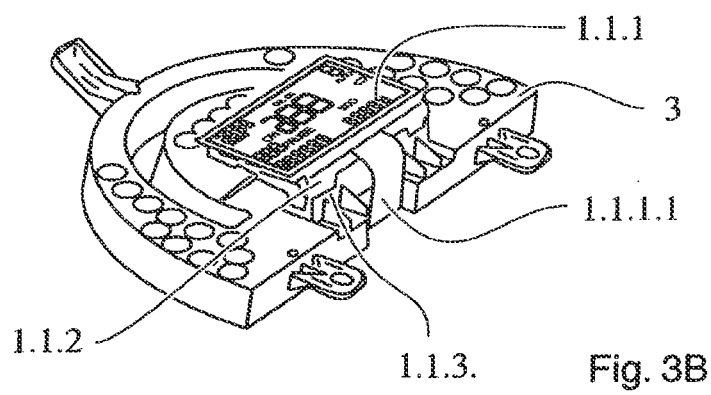
Figure 3C:
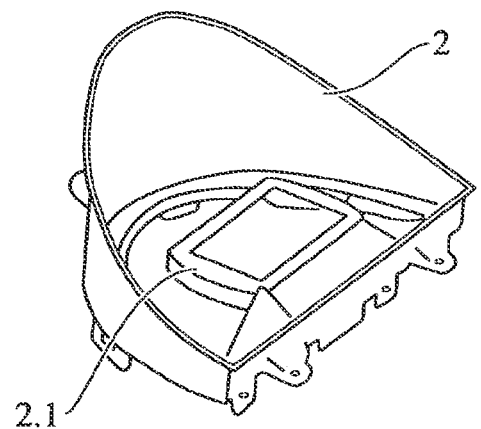
Figure 4A:
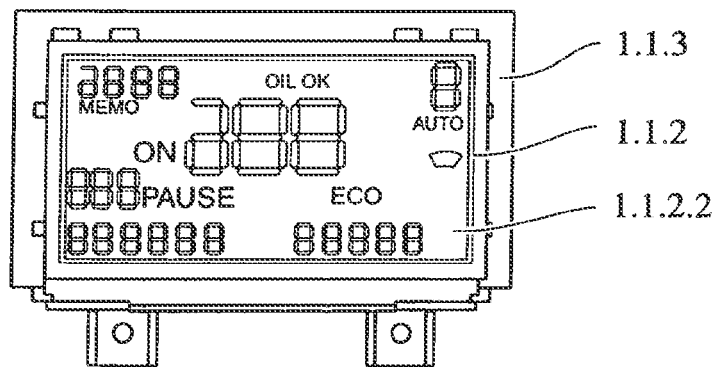
Figure 4B:
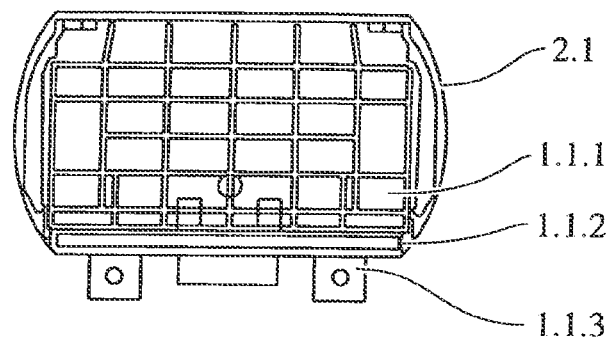
Figure 5A:
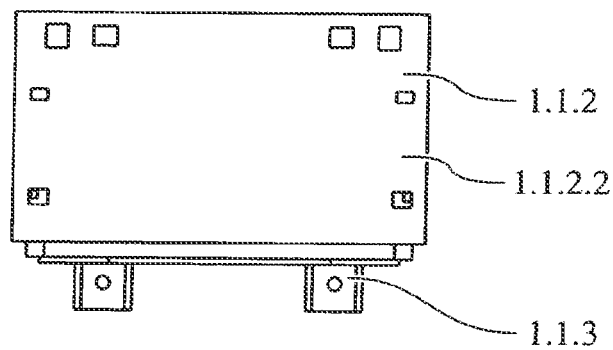
Figure 5B:
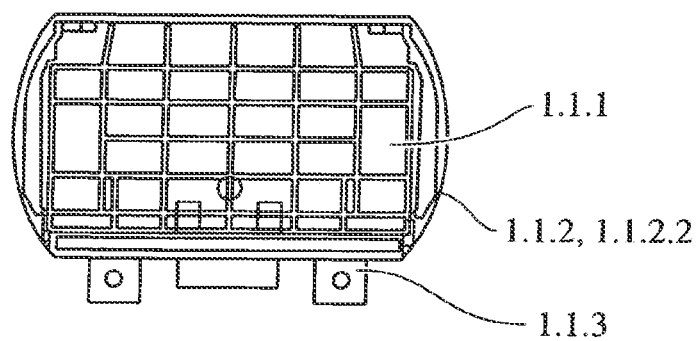
Figure 6A:
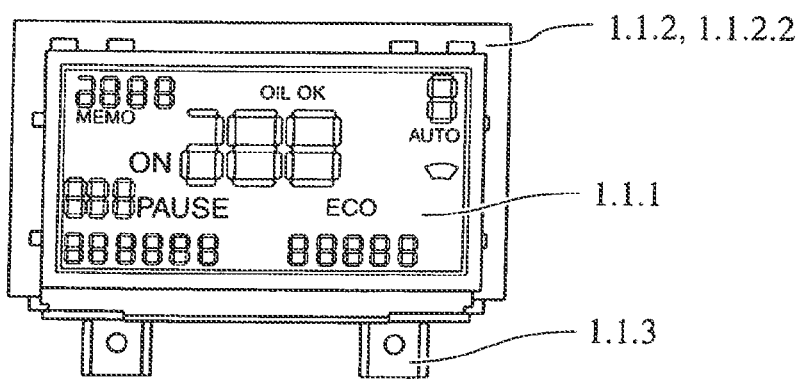
Figure 6B:
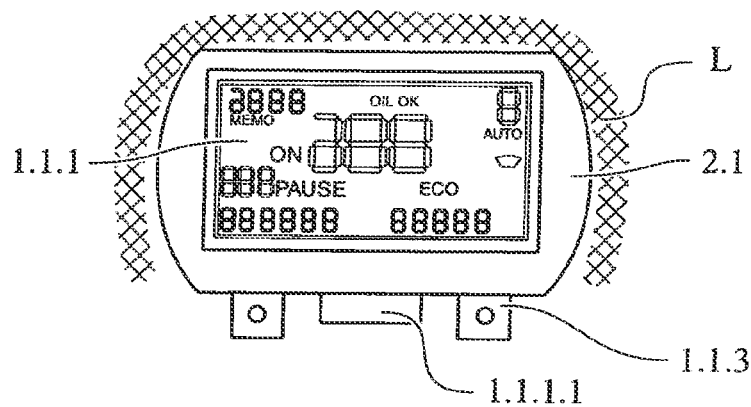

The invention will be understood more readily from the following description, which relates to preferred embodiments, provided as non-limiting examples and explained with reference to the accompanying schematic drawings, in which:

FIG. 1 is a schematic top view of a backlit dashboard,

FIG. 2 is a schematic view of a backlit dashboard according to the known prior art, FIG. 3A is a schematic exploded of a dashboard according to FIG. 2, FIG. 3B is a schematic perspective view of a support device, of a securing device with a source of light and with a backlit display device according to the prior art, FIG. 3C is a schematic perspective view of a frame member of a dashboard, FIG. 4A is a schematic top view of a securing device with a source of light according to the prior art, FIG. 4B is a schematic top view of a support device with a source of light and with a backlit display device according to the prior art, FIG. 5A is a schematic top view of a support device with a source of light, FIG. 5B is a schematic top view of a support device with a source of light and a display device, FIG. 6A is a schematic top view of a display device and a source of light according to FIG. 5B and a securing device, and FIG. 6B is a schematic top view of a backlit display device with displayed information, positioned in a frame member and with almost uniform peripheral illumination.

DETAILED DESCRIPTION

Corresponding portions or component parts in the various figures are designated by the same reference characters in the various figures.

FIG. 1 is a schematic top view of a dashboard 1.

The dashboard 1 is surrounded by a frame device 2. The dashboard 1 comprises at least one display area, the display area comprising a first portion 1.1 of the display area and a second portion 1.2 of the display area. The first portion 1.1 of the display area is surrounded by a frame member 2.1, which is part of the frame device 2. The frame member 2.1 is also referred to below as the frame 2.1. The first portion 1.1 of the display area comprises (or is located in) a first main extension plane. The second portion 1.2 of the display area comprises (or is located in) a second main extension plane. The second main extension plane is located parallel to the first main extension plane, the second main extension plane being offset relative to the first main extension plane in the direction of a user of the dashboard 1 in such a way that the second portion 1.2 of the display area forms a diaphragm aperture 1.3 at least partially around the first portion 1.1 of the display area, and that the first portion 1.1 of the display area is located in a central area of the dashboard 1.

According to a preferred example of the invention, the second portion 1.2 of the display area surrounds the first portion 1.1 of the display area in such a way that the second portion 1.2 of the display area comprises a dial for a needle which can be caused to rotate about an axis of rotation, the needle preferably being provided in the first and second portions 1.1, 1.2 of the display area. For example, the needle may be provided in the form of a bent needle, which is not visible by a user in (or in front of) the first portion 1.1 of the display area and is visible by a user only in (or in front of) the second portion 1.2 of the display area. Alternatively, the needle may be provided in the form of a needle that is visible by a user in (or in front of) the first and second portions 1.1, 1.2 of the display area.

At the point between the first portion 1.1 of the display area and the second portion 1.2. of the display area, a transition is made from the first main extension plane to the second main extension plane. This transition is not visible by a user. The first portion 1.1 of the display area is surrounded, at least partially, by the second portion 1.2 of the display area in such a way that the diaphragm aperture 1.3 is realized. The diaphragm aperture 1.3 is realized as the edge of a diaphragm which surrounds the first portion 1.1 of the display area that is surrounded, at least partially, by the second portion 1.2 of the display area. It is also possible and preferred according to the present invention for the first portion 1.1 to be surrounded completely by the second portion 1.2 of the display area.

In the example depicted here, the first portion 1.1 of the display area is provided as a display device 1.1.1 having the ability to display a number of displayed items of information, especially in the form of a display device with transistors in a thin film (TFT-display, thin-film transistor display). Associated with the display device 1.1.1 is a source of light 1.1.2, which is attached to the display device 1.1.1 by means of a bond effected by adhesion, and/or by the shape of the display device 1.1.1 and of the source of light 1.1.2, and/or by fusion of the materials of the display device 1.1.1 and of the source of light 1.1.2.

The source of light 1.1.2 is used for backlighting the first portion 1.1 of the display area. At the location of the diaphragm aperture 1.3 of the second portion of the display area, that is to say at the location of the transition between the first portion 1.1 of the display area and the second portion 1.2 of the display area, an emergence of the light L takes place in such a way that the emergence is distributed in an almost uniform manner around the diaphragm aperture 1.3, in particular being almost uniform with respect to the backlighting of the second portion 1.2 of the display area.

The emergence of the light L at the location of the diaphragm aperture 1.3 produces an aureole effect ("halo" effect) in the direction of a user of the dashboard, that is to say a crown of light (or a semicircle of light) around the first portion 1.1 of the display area, that is to say around the display device 1.1.1.

The second portion 1.2 of the display area comprises a film (or layer), which is non-transparent in part (or which has a reduced transparency in some parts). Other parts of this film (or this layer) are provided with a greater transparency in the form of symbols and/or in the form of a dial and/or in the form of digits, in such a way that, due to backlighting of the second portion 1.2 of the display area, the symbols and/or the dial and/or digits are readily visible by a user of the dashboard of the vehicle.

FIGS. 2 to 3C depict a dashboard according to the prior art.

The display device 1.1.1 comprises a conducting element 1.1.1.1 connecting the display device 1.1.1 to a control module (not illustrated in the figures and), by means of which the display device 1.1.1 can be controlled. In the example depicted here, the source of light 1.1.2 is realized as a matrix of electroluminescent diodes (LED array, array of light-emitting diodes) and is formed into an angle, comprising a first portion (or branch) 1.1.2.1 and a second portion (or branch) 1.1.2.2, which are oriented relative to one other at an angle of 90°. The first portion (or branch) 1.1.2.1 of the source of light 1.1.2 is oriented horizontally, for example, in its position of use (although depicted vertically in FIG. 3A), and the second portion (or branch) 1.1.2.2 of the source of light 1.1.2 is oriented vertically, for example, in its position of use (although depicted horizontally in FIG. 3A). For example, the second portion (or branch) 1.1.2.2 of the source of light 1.1.2 forms a planar surface that is oriented towards the user. The first portion (or branch) 1.1.2.1 of the source of light 1.1.2 is diverted away from the user and is oriented towards a securing device 1.1.3. The first portion (or branch) 1.1.2.1 of the source of light 1.1.2 is used to position or attach the source of light 1.1.2 to the securing device 1.1.3. The source of light 1.1.2 is attached to the securing device 1.1.3 by means of a bond effected by adhesion, and/or by the shape of the source of light 1.1.2 and of the securing device 1.1.3, and/or by fusion of the materials of the source of light 1.1.2 and of the securing device 1.1.3.

The securing device 1.1.3 has a shape which corresponds to the shape of the source of light 1.1.2, in particular forming an angle having a first portion (or branch) 1.1.3.1 of the securing device 1.1.3 which is oriented horizontally in its position of use (although depicted vertically in FIG. 3A), and having a second portion (or branch) 1.1.3.2. of the securing device 1.1.3 which is oriented vertically in its position of use (although depicted horizontally in FIG. 3A). The securing device 1.1.3 is realized in particular from an electrically insulating material, preferably a plastic material. The securing device 1.1.3 is positioned in particular in a housing for a support device 3 for the dashboard 1. The support device 3 is used in particular to receive a plurality of tight elements. The securing device 1.1.3 is attached to the support device 3 by means of a bond effected by adhesion, and/or by the shape of the securing device 1.1.3 and of the support device 3, and/or by fusing the materials of the securing device 1.1.3 and of the support device 3.

FIGS. 4A and 4B are schematic top views of a securing device 1.1.3 with a source of light 1.1.2. The second portion (or branch) 1.1.2.2 of the source of light 1.1.2. is depicted in FIG. 4A. The display device 1.1.1 and the frame member 2.1 are depicted in FIG. 4B. The second portion (or branch) of 1.1.2.2 of the source of light 1.1.2 comprises a surface which corresponds to a surface of the second portion (or branch) 1.1.3.2 of the securing device 1.1.3, such that the surface of the second portion (or branch) 1.1.3.2 of the securing device 1.1.3 is covered almost completely by the display device 1.1.1.

The surface of the display device 1.1.1 corresponds almost completely to the surface of the second portion (or branch) 1.1.3.2 of the securing device 1.1.3 and to the surface of the second portion (or branch) 1.1.2.2 of the source of light 1.1.2. This surface of the source of light 1.1.2 is thus covered almost completely by the display device 1.1.1.

FIGS. 5A and 5B show a dashboard 1 according to the present invention. In order to achieve backlighting of the second portion 1.2 of the display area in a uniform manner (that is to say in order to achieve uniform backlighting L at the location of the diaphragm aperture 1.3 of the second portion 1.2 of the display area), a securing device 1.1.3 and a source of light 1.1.2 according to the present invention are shown in FIGS. 5A and 5B. In FIG. 5B in particular, it is apparent that the surface of the securing device 1.1.3 and, in particular, the surface of the source of light 1.1.2 according to the present invention are larger than the surface of the display device 1.1.1 (and, in particular, also the surface of the second portion (or branch) 1.1.3.2 of the securing device 1.1.3), so that the source of light 1.1.2 forms a first portion to backlight the first portion 1.1 of the display area and a second portion in which the source of light 1.1.2 extends beyond the first portion 1.1 of the display area.

FIG. 6A is a schematic top view of a display device 1.1.1 and a source of light 1.1.2 according to FIG. 5B and a securing device 1.1.3. FIG. 6A shows the display device 1.1.1 in its illuminated state.

FIG. 6B is a schematic top view of the backlit display device 1.1.1 with displayed information, positioned in the frame member 2.1 with almost uniform peripheral illumination in the second portion of the source of light 1.1.2. When the display device 1.1.1 is positioned with the source of light 1.1.2 and the securing device 1.1.3 in the frame member 2.1 of the frame device 2, the emergence of light L (as illustrated in FIG. 1) is achieved, with the help of which backlighting and the emergence of light L can be achieved in a uniform manner at the point of the transition between the first portion 1.1 of the display area and the second portion 1.2 of the display area (that is to say in part also backlighting of the second portion 1.2 of the display area), but without the need for an additional element or a plurality of additional elements in order to backlight the second portion 1.2 of the display area.

The invention claimed is:

1. A dashboard for an automobile, the dashboard comprising at least one display area;

wherein the display area comprises a first portion and a second portion;

wherein the first portion of the display area is located in a first main extension plane;

wherein the second portion of the display area is located in a second main extension plane;

wherein the second main extension plane is located parallel to the first main extension plane, the second main extension plane is offset relative to the first main extension plane in a direction of a user of the dashboard in such a way that the second portion of the display area forms a diaphragm aperture at least partially around the first portion of the display area, and that the first portion of the display area is located in a central area of the dashboard;

wherein the dashboard comprises a source of light configured to emit light to illuminate the display area, the display area comprises a frame member that defines the first portion of the display area by surrounding the first portion of the display area such that the diaphragm aperture is located at least partially around the frame member, the source of light comprises a first portion configured to backlight the first portion of the display area, the source of light comprises a second portion configured to backlight the second portion of the display area, and the second portion of the source of light extends beyond the first portion of the display area such that the light from the second portion of the source of light illuminates at least a portion of the diaphragm aperture around the frame member and is visible by the user of the dashboard via the diaphragm aperture around the frame member to produce a halo effect around the first portion of the display area.

2. The dashboard as claimed in claim 1, wherein the light from the second portion of the source of light illuminates a region of the frame member to define the first portion of the display area.

3. The dashboard as claimed in claim 1, wherein the light from the second portion of the source of light is visible by a user of the dashboard in the external portion of the frame member to define the first portion of the display area.

4. The dashboard as claimed in claim 1, wherein the dashboard comprises a needle that is caused to rotate about an axis of rotation, the axis of rotation being positioned in the first portion of the display area, the needle being visible by the user only in the second portion of the display area.

5. The dashboard as claimed in claim 1, wherein the first portion of the display area comprises a display device.

6. The dashboard as claimed in claim 5, wherein the display device comprises a matrix type display device.

7. The dashboard as claimed in claim 5, wherein the display device comprises a liquid crystal display.

8. The dashboard as claimed in claim 1, wherein the dashboard comprises a needle that is caused to rotate about an axis of rotation, the axis of rotation being positioned in the first portion of the display area, the needle being visible by the user in the first portion of the display area.

9. A method for assembling a dashboard for an automobile, the dashboard comprising at least one display area, wherein the display area comprises a first portion and a second portion, wherein the first portion of the display area is located in a first main extension plane, wherein the second portion of the display area is located in a second main extension plane, wherein the second main extension plane is located parallel to the first main extension plane, the second main extension plane is offset relative to the first main extension plane in a direction of a user of the dashboard in such a way that the second portion of the display area forms a diaphragm aperture at least partially around the first portion of the display area, and that the first portion of the display area is located in a central area of the dashboard, wherein the dashboard comprises a source of light configured to emit light to illuminate the display area, the display area comprises a frame member that defines the first portion of the display area by surrounding the first portion of the display area such that the diaphragm aperture is located at least partially around the frame member, the source of light comprises a first portion configured to backlight the first portion of the display area, and the source of light comprises a second portion configured to backlight the second portion of the display area;

the method of assembly comprising a stage during which the frame member is positioned in such a way that the second portion of the source of light extends beyond the first portion of the display area such that the light from the second portion of the source of light illuminates at least a portion of the diaphragm aperture around the frame member and is visible by the user of the dashboard via the diaphragm aperture around the frame member to produce a halo effect around the first portion of the display area.

* * * * *